United States Patent [19]

Dallaire et al.

[11] Patent Number: 4,887,835
[45] Date of Patent: Dec. 19, 1989

[54] TELESCOPIC GOLF CART

[75] Inventors: Michel Dallaire; Robert Katz, both of Montreal, Canada

[73] Assignee: St. Lawrence Manufacturing Canada, Inc., Boucherville, Canada

[21] Appl. No.: 189,818

[22] Filed: May 3, 1988

[51] Int. Cl.$^4$ ............................................. B62B 1/04
[52] U.S. Cl. .................................. 280/646; 280/655; 280/DIG. 6; 301/111; 301/119; 403/104
[58] Field of Search ............... 403/104, 373; 280/645, 280/646, DIG. 6, 641, 651, 652, 655; 301/111, 118, 119, 121

[56] References Cited

U.S. PATENT DOCUMENTS

| | | | |
|---|---|---|---|
| 2,563,033 | 8/1951 | Greig | 280/42 |
| 2,647,762 | 8/1953 | Jamieson et al. | 280/646 |
| 2,679,402 | 5/1954 | Sawyer et al. | 280/DIG. 6 X |
| 2,743,115 | 4/1956 | Rutledge | 280/DIG. 6 X |
| 3,265,402 | 8/1966 | Snyder | 280/DIG. 6 X |
| 4,596,484 | 6/1986 | Nakatani | 403/104 |
| 4,761,092 | 8/1988 | Nakatani | 403/104 |

FOREIGN PATENT DOCUMENTS 652407  11/1962  Canada .

Primary Examiner—Charles A. Marmor
Assistant Examiner—Michael Mar
Attorney, Agent, or Firm—Samuel Meerkreebs

[57] ABSTRACT

A telescopically collapsible hand-pulled golf cart comprises a first tubular elongated member which includes bag supports and a pair of parallelogram linkages pivotally mounted at their upper ends to the first member and including wheels at their lower ends. A second elongated member is telescopically slidable in the first member and can be locked thereto. A third elongated member located inside the first member is slidable within the second member. A "Y"-connector is fixedly mounted as the lower end of the third member and has arms which protrude through a slot longitudinally defined on the rear part of the first member. A pair of links join the parallelogram linkages to the arms of the "Y"-connector. The third member is slidable a limited distance within the second member to provide a lost-motion movement to the latter. This allows an adjustment of the second member relative to the first member with no effect on the positions of the wheels. At the two extreme positions of the third member relative to the second member, a further displacement of the second member produces a linear movement of the "Y"-connector along the slot which thus causes by way of the links and the parallelogram linkages the wheels to extend or retract relative to the first member from an operational to a storage position or vice versa.

12 Claims, 4 Drawing Sheets

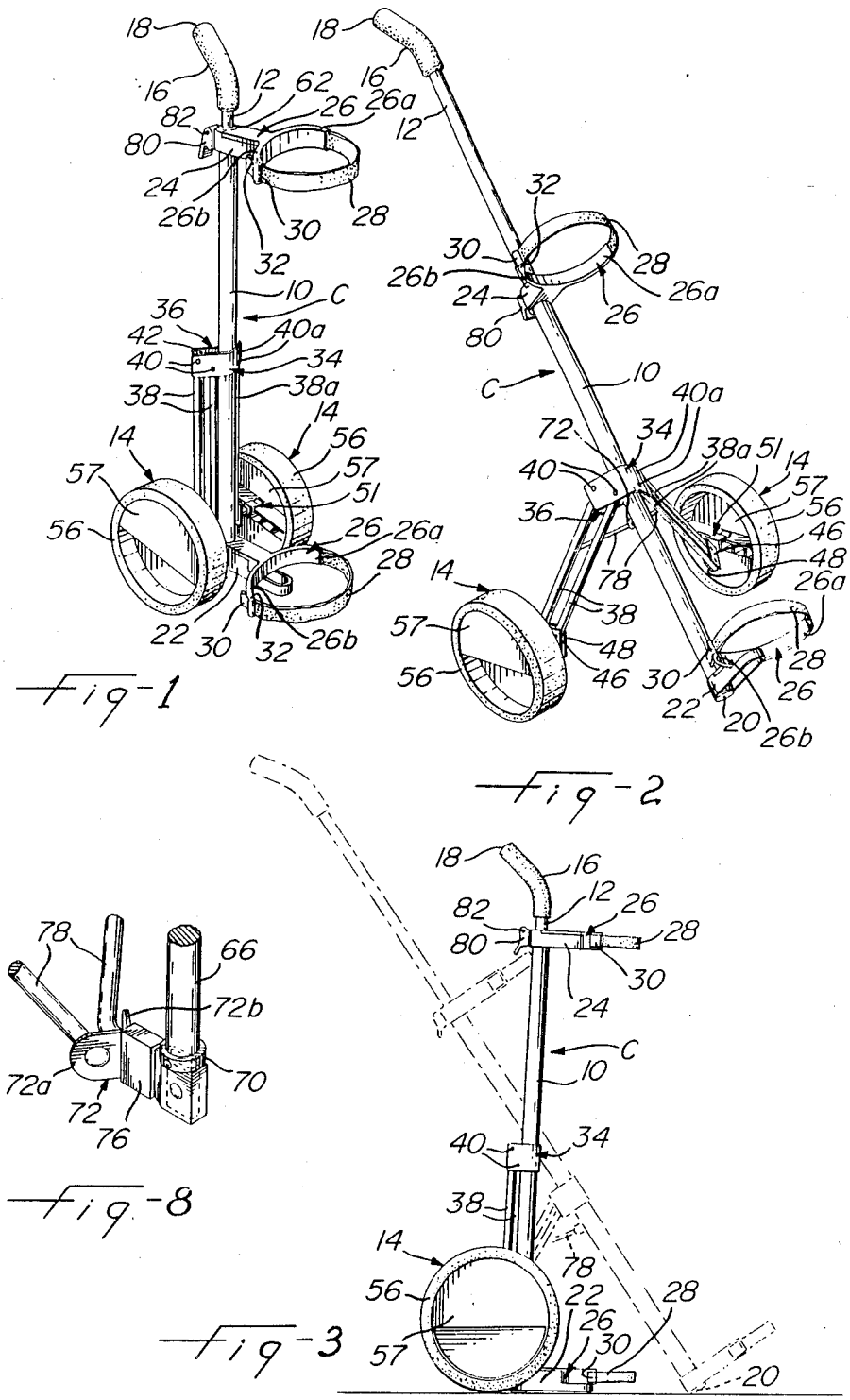

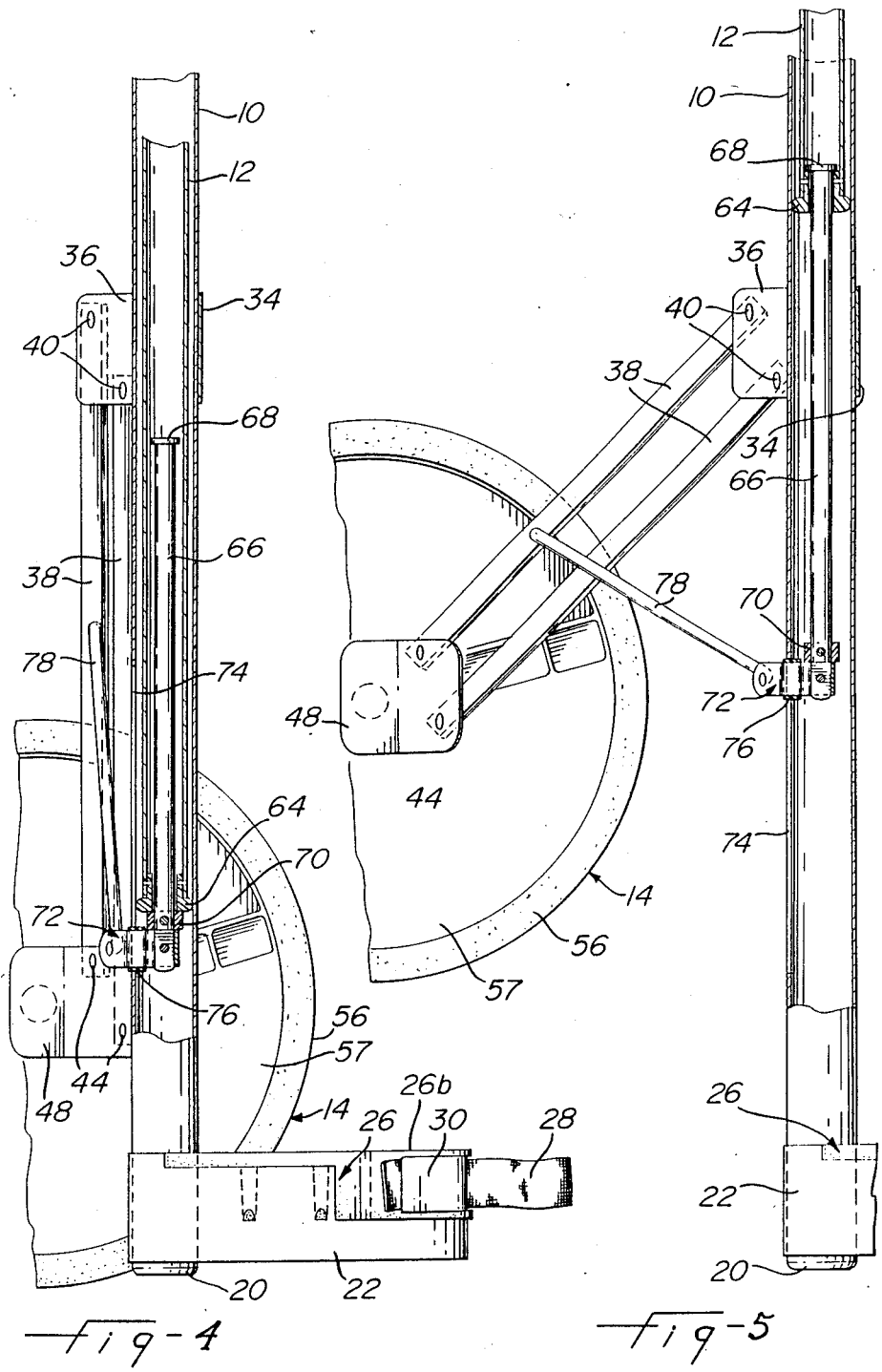

U.S. Patent    Dec. 19, 1989    Sheet 3 of 4    4,887,835
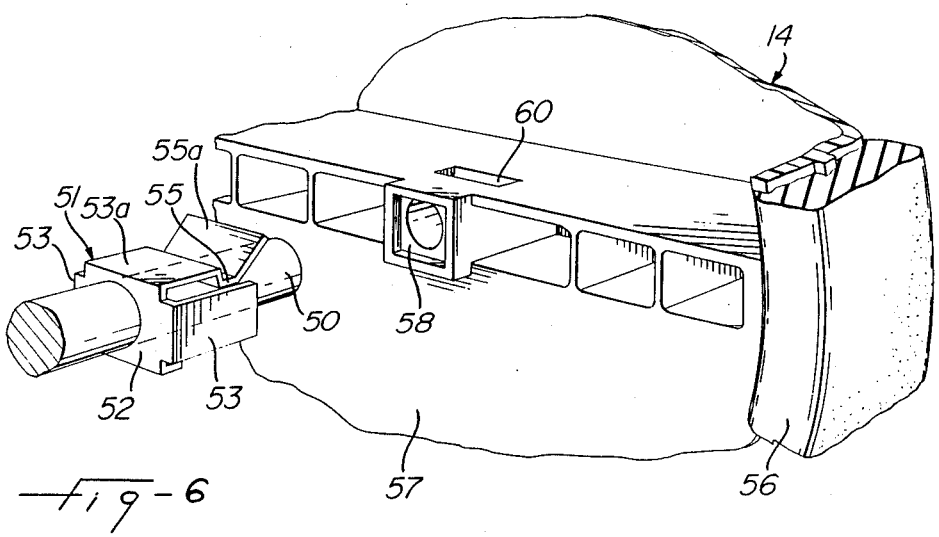
_fig-6_
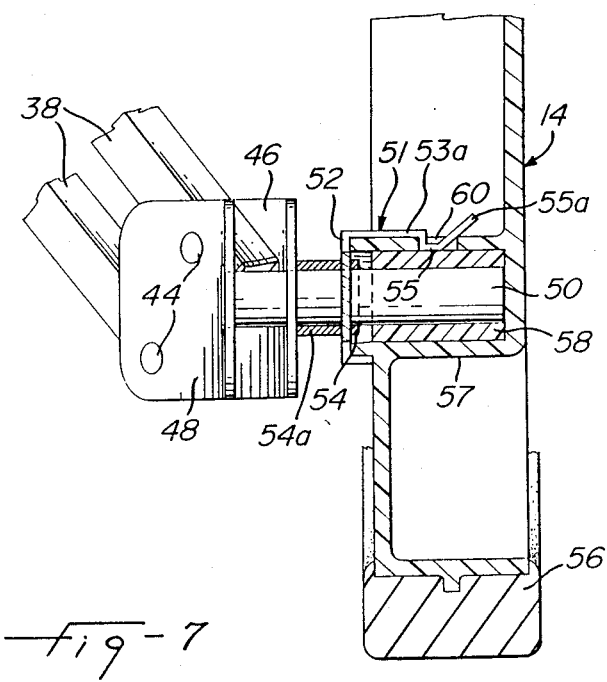
_fig-7_

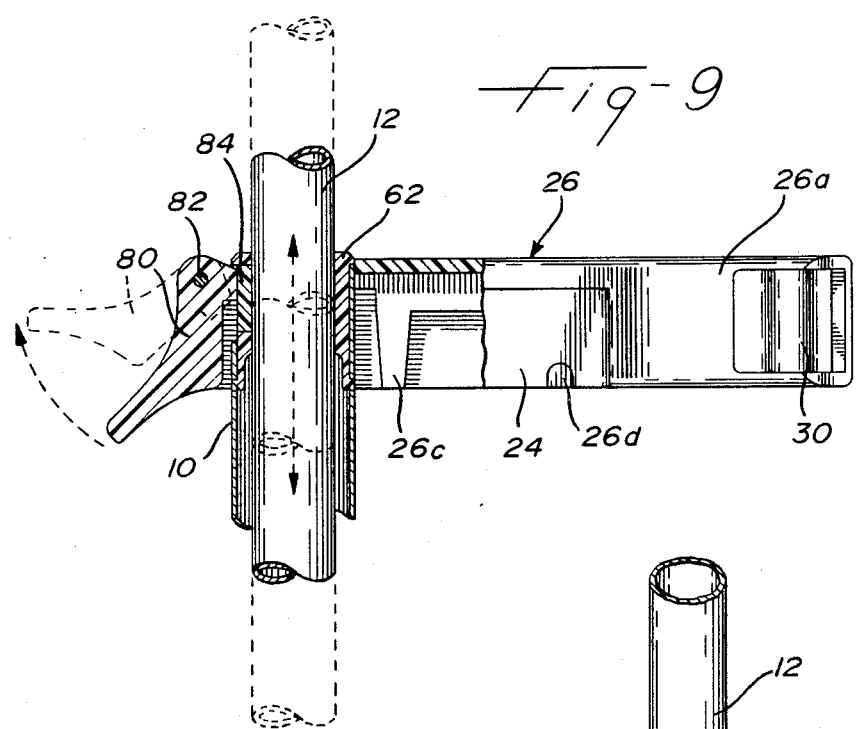
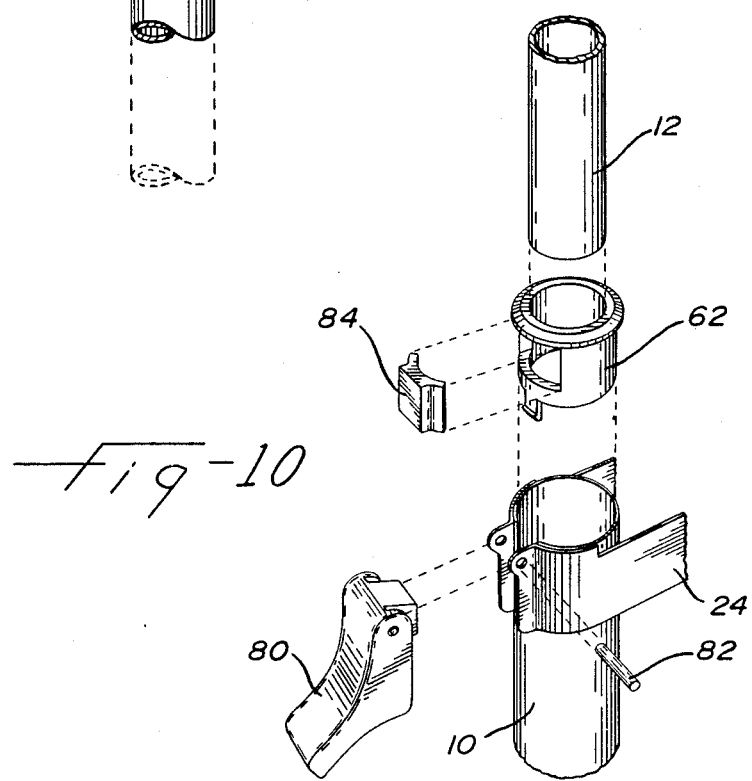

4,887,835

TELESCOPIC GOLF CART

BACKGROUND OF THE INVENTION

1. Field of the Invention

The present invention relates to a collapsible hand-pulled, two-wheeled carrying device, and more particularly, to a golf cart.

2. Description of the Prior Art

Presently, foldable golf carts offer two basic positions: the operative or extended position and the storage or collapsed position. The extended position is similar in all carts: the handle is moved in a way as to unfold or extend the wheels into an operative stable tripod-like structure position. The collapsed position facilitates storage of the cart. It is achieved basically by moving the handle in a way as to, through a linkage structure, retract the wheels. In most cases, the handle is pivoted at the upper end of the cart, actuating the retraction of the wheels inwardly, as both handle and wheels come together at the lower part of the main body of the cart. However, the movement of the handle can also be linear, following the axis of the main body of the cart, while the wheels follow a similar movement to the one described above. Many foldable golf carts have a structural design so as to keep the wheels parallel and functional at all times, even when the cart is in a collapsed position, allowing the narrow cart to be easily wheeled between parked cars.

Some carts, such as the ones disclosed in U.S. Pat. Nos. 2,563,033 and 2,647,762, are designed to be as compact as possible. The former cart has a pivoting handle, while the latter cart has a telescoping handle to produce the retraction of the wheels. However, these two carts do not have the advantage of offering wheels that are functional at all handle positions. On the other hand, carts having everfunctional wheels trade a bit of compactness for maneuverability since they require more complex linkage structures. Canadian Patent No. 652,407 discloses such a cart. The pivoting handle in this patent can actuate the retraction of the wheels while allowing them to be functional even when the cart is in a collapsed position. The cart has a second handle and grip fixed on top of the cart to enable the cart to be steered when in a collapsed position. Two basic goals, therefore, exist: maximum compactness and all-around maneuverability. History shows, however, that the attractiveness of the latter seems to outweigh the need for maximum compactness. It would then seem reasonable to provide wheels that are always parallel and functional while aspiring to a minimum storage volume.

Following up on the analysis of existing golf carts, one can notice that the devices for holding the bag to the cart are not state of the art. In fact, they are simple leather belt-like straps with holes and a pin. This typical design of the strap and its fastening device does not allow for quick and easy mounting and removal of the golf bag to and from the golf cart. Furthermore, the holes in the strap offer only discrete positioning of the pin in the strap, not necessarily ensuring, therefore, tightness between the bag and the supporting means of the golf cart.

SUMMARY OF THE INVENTION

It is an aim of the present invention to provide an improved golf cart characterized by wheels that are always parallel and functional, yet providing maximum compactness to the improved golf cart.

It is also an aim of the present invention to use a telescopic handle which will, with its inherent linear motion, simplify the linkage structure that is necessary to allow the cart to move from a collapsed position to an operative, extended position and vice versa.

It is a further aim of the present invention to provide an improved wheel assembly for a cart or similar vehicle.

It is a further aim of the present invention to use a telescopic handle that includes a lost-motion movement in its linear mechanism so as to allow, in both the storage and operative positions, the adjustment of the grip and the handle to the user's preference with no effect on the position of the wheels.

A construction in accordance with the present invention comprises a golf cart including a tubular first elongated member and a second elongated member telescopically slidable in the first member. Means are provided for connecting a grip to the upper end of the second member. Bag supporting means are mounted fixedly to the first member. Locking means are provided for securing the second member relative to the first member and at least a "V"-shaped bracket mounted fixedly to the first member. The "V"-shaped bracket has a pair of arms that extend divergently from one another and rearwardly from the first member. A pair of parallelogram linkages are provided with means pivotally mounting the upper end of each parallelogram linkage to the corresponding arm of the "V"-shaped bracket, wherein the parallelogram linkages are adapted to pivot in the respective planes of the arms of the "V"-shaped bracket. Wheels are pivotally mounted to the lower end of the parallelogram linkages. A slot is defined longitudinally on the rear part of the first member and below the "V"-shaped bracket. Means are provided for mounting a "Y"-connector at the lower end of the second member, with the arms of the "Y"-connector protruding through the slot at a right angle to the second member. A pair of links are provided wherein each link is pivotally mounted at one end to a respective arm of the "Y"-connector and at the other end to one of the two parallelogram linkages intermediate the upper and the lower ends thereof. When the second member is fully telescoped from the first member, the wheels are caused to spread outwardly by means of the parallelogram and associated links, whereas the wheels are retracted when the second member is fully retracted into the first member.

A further aspect of the present invention comprises the second member which is also tubular and has bushing means at the lower end thereof slidable within the first member. The means mounting the "Y"-connector to the second member includes an elongated third member fixedly connected at the lower end thereof to the "Y"-connector. The third elongated member extends through the bushing into the second member within which the former is slidable. The third member includes a shoulder at the upper end thereof adapted to abut against the bushing, whereby the third member provides a lost-motion movement allowing the second member, to which the grip is mounted, to be extended and retracted in reference to the first member a limited distance without causing the wheels to extend or to collapse.

A still further aspect of the present invention comprises a wheel assembly having a wheel support and a shaft extending therefrom and a wheel that includes a hub and a bushing mounted within the hub. The bushing is rotatable and slidable on the shaft, the latter being provided with wheel retaining means that include a body defining a bore for receiving the shaft and also provided with means to allow rotational movement of the body while preventing axial movement thereof. The wheel retaining means include at least one arm extending from the body towards the wheel, whereas the hub includes an arm receiving surface, the arm and the arm receiving surface including cooperating hook and slot means provided on one and the other for detachably engaging the hub, thereby retaining the wheel against axial movement relative to the body while allowing rotational movement therewith.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a perspective view of the golf cart in its collapsed or storage position;

FIG. 2 is a perspective view of the golf cart in its operative or extended position;

FIG. 3 is a side elevation of the golf cart in its collapsed position with the cart shown in dotted lines in its extended position;

FIG. 4 is a side elevation, partly in cross-section, of the lower part of the golf cart in its collapsed position and of the bag supporting means;

FIG. 5 is a side elevation, partly in cross-section, of the golf cart in its extended position;

FIG. 6 is a fragmentary perspective view of the wheel assembly;

FIG. 7 is a rear elevation, partly in cross-section, of the wheel assembly;

FIG. 8 is a perspective view of the "Y"-connector taken from FIG. 5;

FIG. 9 is a side view, partly in cross-section, of the cam lock and the upper bag supporting means; and FIG. 10 is an exploded view of the cam lock assembly.

DESCRIPTION OF THE PREFERRED EMBODIMENTS

Referring mainly to FIGS. 1 to 3, the cart C includes a main frame member 10, a handle 12, and both are extruded aluminum tubes. The handle 12 slides within the main frame member 10 and operates, as will be seen later, the mechanism that extends or retracts the wheels 14 relative to the main frame member 10. A grip 16 and an end cap 18 are mounted at the upper end of handle 12. A skid 20 is located at the lower end of the main frame member 10.

A golf bag is supported on the golf cart C at its base by a metal lower support 22 which is clamped or otherwise fixed to the lower end of the main frame member 10. An upper support 24, also made of metal, is mounted to the top end of the main frame member 10 (see FIG. 2). Both supports 22 and 24 have a short tubular shape with an elongated cross-section, the walls of the supports 22 and 24 being parallel to the main frame member 10. The supports 22 and 24 each have four recesses which are defined and paired on the lower edges of each of their elongated sides.

Two plastic bag supports 26 each include two curved side arms 26a and 26b, four vertical arms 26c, a strap 28, and a cam lock 30. The four vertical arms 26c are mounted at their upper ends to the upper portion of the bag supports 26 and are slidable within the elongated sides of the supports 22 and 24 (see FIGS. 4, 9, and 10). The vertical arms 26c each have a protrusion 26d at their lower ends that extend outwardly so as to engage tightly within the recesses defined in the supports 22 and 24, whereby the bag supports 26 can be snapped onto the supports 22 and 24. The two bag supports 26 mounted onto the supports 22 and 24 secure the golf bag laterally to the golf cart C by means of the straps 28 and the cam locks 30. Each bag support 26 has the strap 28 attached at the end 26a of the curved support 26, and a cam lock 30 is pivotally mounted at its other end 26b by means of a pin 32. The free end of the strap 28 is, therefore, inserted in the cam lock 30 and tightly secured to ensure the stability of the golf bag on the golf cart C.

Angled hinge plates 34 and 36 are respectively welded (see FIG. 1) on the front and the back side of the main frame member 10. Upper ends of a pair of parallelogram leg struts 38 and 38a are pivoted at 40 and 40a between hinge plates 34 and 36 (see FIGS. 1 and 2). Leg strut caps 42 are mounted on the ends of leg struts 38 and 38a. Only struts 38 will be described as struts 38a are identical. The lower ends of leg struts 38 are pivoted at 44 to a pair of dual hinge plates 46 and 48 to which, in this preferred embodiment, is mounted an axle or shaft 50 (see FIGS. 4, 5, and 7).

Referring now to FIGS. 6 and 7, metal clip 51 comprises a main body 52 with a bore defined in it and three arms 53 each extending at a right angle from an edge of the main body 52 of the clip 51. The main body 52 is rotatably mounted to a shaft 50, with the arms 53 extending away from the hinge plates 46 and parallel to the shaft 50. Two spacers 54 and 54a are fixedly mounted to the shaft 50 on each side of the main body 52 to allow each clip 51 to freely rotate about the shaft 50 while being confined axially to that shaft. One arm 53a of clip 51 is bent to form a hook 55 and tab 55a.

Each wheel 14 comprises a tire 56, a hub 57, and a bushing 58 mounted within the hub 57. Hollows within the hub 57 define wall sections that are parallel to and slidable within the arms 53 of the clips 51. A slot 60 is defined on the hub 57 so as to receive the hook 55 of the arms 53a of clip 51. The wheels 14 are each mounted to a shaft 50 by pressing its hub 57 including the bushing 58 onto the shaft 50, whereby sections of the hub 57 slide within the arms 53 of a clip 51 as the hook 55 engages in the slot 60 of the hub, thus securing the wheel 14 to the shaft 50 (see FIGS. 6 and 7).

This embodiment allows the clips 51 and the wheels 14, including the tires 56, the hubs 57, and the bushings 58, to rotate about the fixed shafts 50, also ensuring easy mounting and removal of the wheels 14.

A collar 62 is mounted on the upper end of the main frame member 10 to guide and support the handle 12 as it slides in and out of the main frame member 10 to position the wheels 14. Referring now mainly to FIGS. 4 and 5, a slide 64 fixed at the lower end of the handle 12 slides within the main frame tube 10 and acts as a bushing for an actuating rod 66. The actuating rod 66 is longitudinally disposed within the handle 12 and has a free upper end capped by a flanged head 68. A collar 70 is riveted to the lower end of the actuating rod 66. A "Y"-shaped connector 72 is slidably mounted through a slot 74 in such a way that the arms 72a and 72b of the "Y"-connector protrude from the main frame member 10 parallel to the angled hinge plates 34 and 36 while its other end is riveted to the lower end of the actuating rod 66 (see FIG. 8). A plastic friction cup 76 is fixedly mounted to the "Y"-connector 72 to provide support to the latter and to facilitate the movement of the "Y"-connector 72 as it channels in the slot 74. A pair of links 78 are pivotally connected each at one end to a respective arm 72a and 72b of the "Y"-connector 72 and each at the other end to a corresponding leg strut 38, that is, to the struts in each set.

The operation of the handle 12 and the resulting movements of the actuating rod 66, the "Y"-connector 72, the links 78, the leg struts 38, and the wheels 14 will be described further.

A cam lock 80 is pivotally mounted with pin 82 on the side arms formed by the rearward continuation of clamped upper support 24. As the cam lock 80 is rotated downwardly in a plane parallel to the axis of the handle 12, it contacts a plate 84 through an opening defined in the main frame member 10. The plate 84, which will be described below, then contacts the handle 12. The lateral force exerted by the cam lock 80 on the plate 84 is, therefore, transmitted to the handle 12. The friction forces so developed on the handle 12 secure the latter in a desired position within the main frame member 10.

The collar 62 is elongated downwardly inside the main frame member 10 and slidably around the handle 12. This prolongation of the collar 62 includes an opening through which the plate 84 can slide so as to transmit to the handle 12 the force applied by the cam lock 80 as described above.

The plate 84 comprises a first side that is curved so as to follow the corresponding outline of the handle 12 and slidable within the opening defined in the collar 62 (see FIGS. 9 and 10). The second side of the plate 84, opposite the first side, is plane, slidable within the opening defined in the main frame member 10 and of lesser dimensions than those of the first side of the plate 84, thereby defining shoulders to the plate 84, whereby the latter cannot slide out of the main frame member 10. When mounted, the curved side of the plate 84 is loosely supported laterally by the edges defining the opening in the collar 62, while the plane side is slidably supported by those defining the opening in the main frame member 10.

With the cam lock 80 in an unlocked position, the plate 84 is supported diametrically relative to the main frame member 10 by the handle 12 on the curved side of the plate 84 as the inside of the edges defining the opening in the main frame member 10 abuts the shoulders of the plate 84. When the cam lock 80 is in a locked position, the contact surface thereof abuts the plane side of the plate 84 as both surfaces are then parallel, whereby a force is exerted on the handle 12 as described above.

The locking mechanism is, therefore, improved because of a better distribution of the forces from the cam lock 80 to the handle 12, resulting from the linear movement of the brake plate 84 since a construction with the brake plate 84 would require that the cam lock 80 pivot directly onto the curved surface of the handle 12. Furthermore, the use of the brake plate 84 between the contact areas of the cam lock 80 and the handle 12 to transmit the force exerted by cam lock 80 to the handle 12 increases the friction forces on the handle 12 because of the larger contact surface of the brake plate 84 than that of the cam lock 80.

To change the golf cart C from the collapsed or storage position to the extended or operative position, the cam lock 80 is released. The handle 12 is extended from out of the main frame tube 10 by way of the grip 16. The slide 64 slides up the actuating rod 66 towards flanged head 68. The contact between the slide 64 and the flanged head 68 produces the upwardly linear movement of the actuating rod 66, the flanged head 68, the lower slide 70, the "Y"-connector 72, and the friction cup 76, the latter sliding upwardly within the slot 74 of the main frame tube 10. The linear movement of the "Y"-connector 72 produces the rotation of the links 78 about the arms of the "Y"-connector 72 rearwardly and divergingly from the main frame member 10, thus spreading the leg struts 38 and the wheels 14 divergingly and rearwardly from the main frame member 10. Thus, the golf cart C, when fully extended, assumes a tripod-like structure ensuring cart stability in the operative position. The grip 16 can now be adjusted to the most comfortable setting for the player by lowering the handle 12 into the main frame member 10. The section of the actuating rod 66 between the flanged head 68 and the lower collar 70 provides a lost-motion movement allowing the handle 12 to which the grip 16 is mounted to be extended or retracted relative to the main frame member 10 a distance equal to the length of that section without causing the wheels 14 to extend or to collapse. The lowering of the cam lock 80 fastens the handle 12 within the main frame member 10 maintaining the grip 16 in the desired setting, the golf cart C thus being in full operative position.

The reverse maneuver produces the collapsing of the golf cart C back into the storage position. The cam lock 80 is rotated upwardly so as to allow the handle 12 to be pushed into the main frame member 10. The slide 64 contacts the lower collar 70, thus pushing downwardly the actuating rod 66, the "Y"-connector 72, and the friction cup 76. The links 78 rotate upwardly and convergingly towards the main frame tube 10, retracting the leg struts 38 and the wheels 14, hence facilitating the storage of the golf cart C. The cam lock 80 can then secure the handle 12 in its most inserted position relative to the main frame member 10. The handle 12 can also be pulled back out from the main frame member 10 within the length of the lost-motion section of the actuating rod 66, then fastened into the intermediate position with the cam lock 80 so as to establish a more comfortable setting for the user steering the golf cart C while it is in a collapsed position.

The wheels 14 are maintained in their extreme positions by the abutment of the slide 64 with the flanged head 68 in the extended setting of the cart C or with the lower collar 70 in the collapsed setting thereof. Hence, the wheels are not limited to these extreme positions if the slide 64 is positioned between the flanged head 68 and the lower collar 70, meaning on the lost-motion section of the actuating rod 66. However, the wheels 14, under normal use, will remain in the preset appropriate extreme position thereof because of the structure of the cart C.

To summarize, the overall linkage mechanism ensures the parallelism of the wheels 14 for every position of the handle 12, more particularly through the use of a pair of parallelogram linkage structures each characterized by two parallel leg struts 38 of the same length.

The telescopic design provides the golf cart C with a simpler overall mechanism, a single grip 16 usable for every position of the wheels 14. Furthermore, this telescopic design eliminates the need to bend over when changing the golf cart C from a storage to an operative position or vice versa. The use of an internal mechanism improves the compactness of the golf cart, while the actuating rod 66 allows for the handle 12 to be adjusted when the golf cart C is in a storage, an operative, or any intermediate position.

The cam lock 80 easily fastens or releases the handle 12 within the main frame member 10.

The cam locks 30 acting on the straps 28 ensure easy mounting and dismounting of the golf bag on the bag supports 26 and on the lower and upper supports 22 and 24 respectively.

Economic manufacturing is enhanced by the use of plastic parts such as the wheels 14, the cam locks 30 and 80, and the bag supports 26.

Factory mounting is simplified through the use of the bag supports 26 that are snapped onto the lower and upper supports 22 and 24, the wheels 14 that are mounted to the axles 50 through the clips 52, and the rubber tires 56 that are manually extended, then mounted onto the wheels 14. The bag supports 26, the wheels 14, and, more conveniently so, the tires 56, are, therefore, easily replaceable when wear so dictates.

I claim:

1. A golf cart including an elongated tubular first member, an elongated tubular second member telescopically slidable in said first member, grip means on said second member, bag supporting means fixedly mounted to said first member, locking means to secure said second member at a desired position relative to said first member, at least a "V"-shaped bracket fixedly mounted to said first member, said "V"-shaped bracket having two arms extending divergingly from one another and rearwardly from said first member, a pair of parallelogram linkages each pivotally mounted at an upper end thereof to a corresponding arm of said "V"-shaped bracket, wherein said parallelogram linkages are adapted to pivot in the respective planes of the arms of the "V"-shaped bracket; a wheel assembly mounted at a lower end of each of the parallelogram linkages, a slot defined longitudinally on a rear part of the first member and below the "V"-shaped bracket, a pair of links each pivotally mounted at one end thereof to an arm of a connector means protruding from said first member through said slot and at another end thereof to a respective one of said parallelogram linkages intermediate said upper and lower ends thereof; a third elongated member provided in said first member, said third elongated member having abutment means for limiting telescopic movement of said third member relative to said second member, said third member being fixedly mounted at a lower end thereof to said connector means, said third member providing a lost-motion movement allowing the second member, to which the grip is mounted, to be extended and retracted relative to the first member a limited distance without causing the wheel assemblies to spread or collapse.

2. A golf cart as defined in claim 1, wherein said connector means is a "Y"-connector and wherein said abutment means comprises a bushing means at a lower end of said second member, said bushing means being slidable within said first member, said third member extending through said bushing means into said second member and slidable therethrough, said abutment means further comprising a shoulder at an upper end of said third member and adapted to abut against said bushing means at one limit of said limited distance when said second member is extended relative to said first member to cause spreading of the wheel assemblies relative to said first member, said bushing means abutting said "Y"-connector at another limit of said limited distance when said second member is inserted in said first member to cause collapsing of the wheel assemblies.

3. A golf cart as defined in claim 1, wherein said wheel assembly comprises at least a wheel support, a shaft extending from the wheel support, a wheel comprising a hub and a bushing mounted within said hub, said bushing being rotatable and slidable on said shaft, wheel retaining means provided on said shaft, said wheel retaining means including a body defining a bore for receiving the shaft, means on said shaft for preventing axial movement of the body but for allowing rotational movement thereof, the retaining means including at least one arm extending from the body towards said wheel, said hub including an arm receiving surface, the arm and arm receiving surface including cooperating hook and slot means provided on one and the other for detachably engaging said hub, thereby retaining said wheel against axial movement relative to the body while allowing rotational movement therewith.

4. A golf cart as defined in claim 1, wherein the locking means used to fasten the second member within the first member comprises a cam lock pivotally mounted to the first member, an opening defined in the first member therethrough, wherein the contact surface of said cam lock abuts the second member when said cam lock is positioned downwardly, thereby exerting pressure so as to restrain said second member in position relative to said first member.

5. A golf cart as defined in claim 4, wherein a collar means is mounted at the upper end of the first member, said second member being telescopically slidable within said first member.

6. A golf cart as defined in claim 5, wherein the locking means used to fasten the second member within the first member also includes a device located between said cam lock and the second member, said device including a downwardly tubular prolongation of the collar means inside the first member and slidably around the second member, an opening defined on said prolongation, said opening located on a section of said prolongation that is between the axis of the second member and the opening defined on the first member, both said openings being opposite each other on a radius extending from the axis of the first member towards said contact surface of said cam lock, a plate having a first side shaped so as to follow the outline of a section of the second member, said section of the second member corresponding with said opening in said prolongation, said plate also having a plane second side opposite said first side, the edges of said first side being slidable within said opening defined in said prolongation of the collar means, the edges of said second side being slidable within said opening defined in the first member, said second side being of smaller area than that of said first side therefore producing shoulders on said plate, said plate having the first side and the second side thereof loosely supported laterally by the edges defining the opening in said prolongation and by the edges defining the opening in said first member respectively, whereby as the cam lock is pivoted to the downward position thereof, said contact surface of said cam lock is parallel to the second side and abuts said second side, said first side thus abutting the second member, whereas when the cam lock is in the upward position thereof, the plate is loosely supported by the edges defining both said openings and restrained diametrically relative to the first member by the loose contacts of the shoulders of the plate with the edges defining the opening in the first member and of the first side of the plate with the corresponding section of the second member.

7. A golf cart as defined in claim 1, wherein said bag supporting means includes at least two bag retaining means each comprising a first section mounted fixedly to the first member, a second section, said first and second sections including cooperating hook and slot means provided on one and the other for detachably engaging the second section to the first section, said second section also having two side arms, a strap mounted at one end thereof to a first said side arm, said strap then surrounding the golf bag and being fastened to the second side arm by a strap locking means so as to secure tightly the golf bag to the golf cart.

8. A golf cart as defined in claim 7, wherein the lowest bag retaining apparatus relative to the first member includes a bag support mounted to said first section, said bag support extending under said second section and between the side arms thereof.

9. A golf cart as defined in claim 7, wherein said second section is made of molded plastic.

10. A golf cart as defined in claim 7, wherein said strap locking means comprise a cam lock mounted pivotally to the second side arm, said cam lock allowing the strap inserted therethrough to be fastened in any intermediate position thereof.

11. A golf cart as defined in claim 1, wherein means for maintaining the wheels parallel are provided which include a pair of said "V"-shaped brackets fixedly mounted to the first member, each said "V"-shaped bracket having two arms each diverging from one another and rearwardly from said first member, said arms of one of the "V"-shaped brackets each being parallel to a corresponding arm of the other "V"-shaped bracket, each said parallelogram linkage comprising two elongated parallel members of the same length, each said elongated member being pivotally mounted at spaced-apart points between a pair of said corresponding arms of the "V"-shaped brackets, wherein the parallelogram linkage is adapted to pivot in the respective planes of the corresponding arms of the "V"-shaped brackets, the other ends of the elongated members forming a parallelogram linkage by being pivotally mounted at the lower part thereof to a second pair of parallel brackets, said second pair of parallel brackets defining a bore for receiving the shaft of at least a wheel, included in said wheel assembly the ends of said elongated member each being pivotally mounted at spaced points between sections of said second pair of parallel brackets, said sections being in the same plane as the corresponding arms of the "V"-shaped brackets, whereby each parallelogram linkage and the wheel associated therewith pivot in said plane, to maintain wheels parallel to each other as the golf cart is in a storage position, an extended position, or any intermediate position thereof.

12. A golf cart including an elongated tubular first member, an elongated second tubular member telescopically slidable in said first member, grip means on said second member, bag supporting means fixedly mounted to said first member, locking means to secure said second member at a desired position relative to said first member, a pair of wheel assemblies pivotally mounted to said first member for spreading and collapsing movement relative to said first member, link means pivotally joining said wheel assemblies to a connector means protruding through said first member in a slot longitudinally defined therein, a third elongated member being provided in said first member and sliding within said second member, said third elongated member having abutment means for limiting telescopic movement of said third member relative to said second member, said third member being mounted at a lower end thereof to said connector means, said third member providing a lost-motion movement allowing the second member to be extended and retracted relative to the first member a limited distance without causing the wheel assemblies to extend or collapse, said second and third members co-acting at the limits of said limited distance for causing the wheel assemblies to spread outwardly when the second member is drawn out from the first member and to retract when the second member is inserted into the first member.

* * * * *